June 30, 1953 A. R. TURNER Re. 23,678
COVER LIFT HINGE
Original Filed Oct. 18, 1947
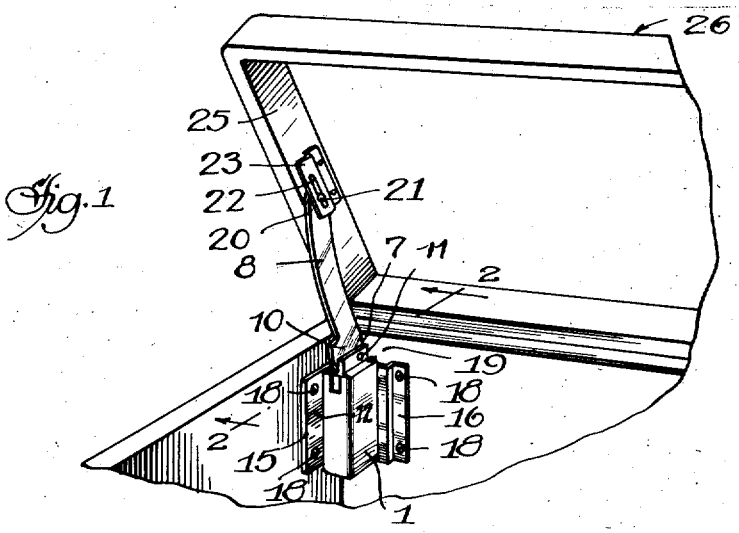
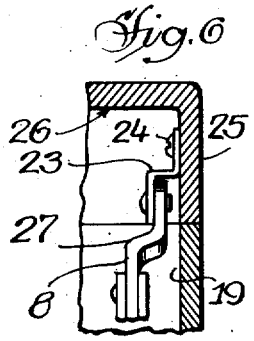
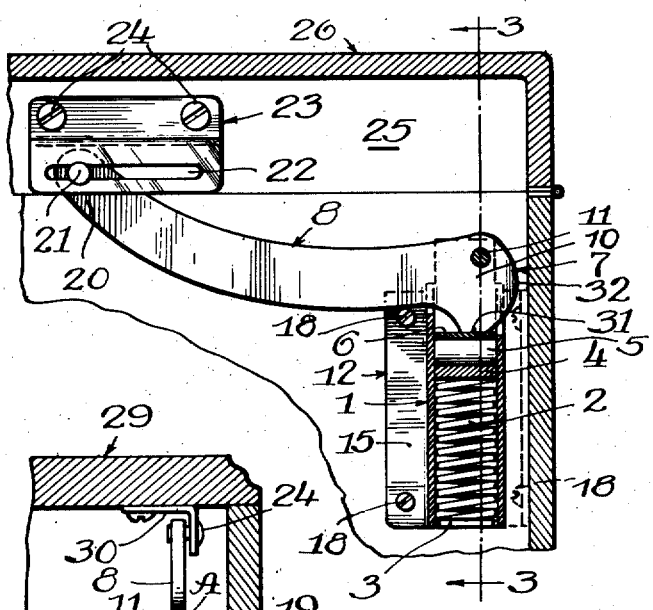
Fig. 2
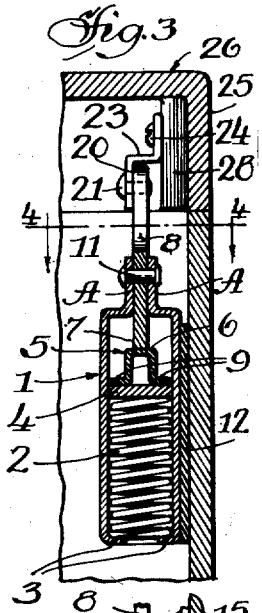
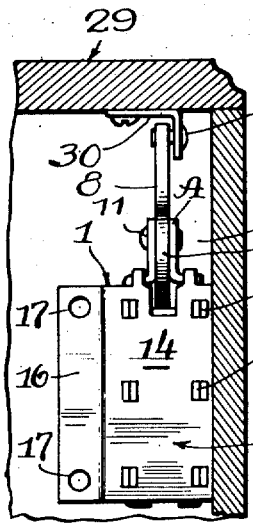
Fig. 5
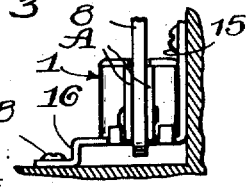
Fig. 4
INVENTOR.
Alonzo Robert Turner,
BY
Carl H. Seffert
Atty.

Reissued June 30, 1953

Re. 23,678

UNITED STATES PATENT OFFICE 23,678

COVER LIFT HINGE

Alonzo Robert Turner, Cottage Grove, Wis.

Original No. 2,483,947, dated October 4, 1949, Serial No. 780,694, October 18, 1947. Application for reissue July 11, 1950, Serial No. 173,211

4 Claims. (Cl. 217—60)

Matter enclosed in heavy brackets [ ] appears in the original patent but forms no part of this reissue specification; matter printed in italics indicates the additions made by reissue.

The present invention relates to a cover lift construction and especially to a novel cover lift hinge for retaining the pivoted lid or top of a cabinet or the like in open or closed position.

In cabinets of the type provided for radios, record players, etc. and having a pivoted or hinged lid or top, difficulty has been experienced in retaining the latter in open position. The present construction provides a lift hinge used in combination or association with the conventional butt hinges now employed in pivotally mounting the lid so as to permit it to be opened or closed by the operator lifting the lid to open position or lowering the lid to return it to closed position. As the use of such butt hinges makes no provision for retaining the lid in open position or when closed, retaining it against accidental opening, I have developed the present invention which provides positive means for automatically locking and retaining the lid in open position, and also for locking the lid in closed position to thereby eliminate vibrations of certain chords of music and voice.

The novel cover lift hinge construction of the present invention comprehends a housing adapted to be mounted in the cabinet and provided with a spring-pressed cam arm having one end slidably mounted in a slot in a bracket mounted on or in the lid.

Another important object of the present invention is the provision of a novel cover lift hinge assembly which is so constructed, arranged and mounted in the cabined as to substantially reinforce the latter.

Further objects are to provide a construction of maximum simplicity, efficiency, economy and ease of assembly and operation, and such further objects, advantages and capabilities as will later more fully appear and are inherently possessed thereby.

The invention further resides in the construction, combination and arrangement of parts illustrated in the accompanying drawing, and while there is shown therein a preferred embodiment, it is to be understood that the same is susceptible of modification and change, and comprehends other details, arrangements of parts, features and constructions without departing from the spirit of the invention.

In the drawing:

Figure 1 is a view in perspective of the novel cover lift hinge as applied to a cabinet having a pivotally mounted lid or closure and the latter provided with a depending and encompassing flange.

Fig. 2 is an enlarged view in vertical cross-section taken in a plane represented by the line 2—2 of Fig. 1.

Fig. 3 is a view in vertical cross-section taken in a plane represented by the line 3—3 of Fig. 2, but showing the lid bracket mounted upon a block secured to the depending flange of the lid.

Fig. 4 is a top plan view of the housing for the cover lift hinge and showing the manner of mounting the housing in the corner of the cabinet, the view being taken on the line 4—4 of Fig. 3.

Fig. 5 is a fragmentary view showing in rear elevation the cover lift hinge assembly but with its cam pivotally attached to an L bracket mounted on the underside of a flat top or lid.

Fig. 6 is a fragmentary view showing the cam arm bent and its upper end connected to a Z bracket.

Referring more particularly to the novel cover lift hinge construction or assembly as shown in Figs. 1 to 4 inclusive, the assembly includes a housing 1 providing an enclosure for a coil spring or tension means 2, the lower end of the coil spring seating upon and being retained by a pair of inturned ears or flanges 3 at the base of the housing, and the upper end carrying a plate 4 slidably mounted in the housing. Upon this plate or block 4 is carried an inverted, substantially U-shaped saddle or member 5 having its upper face or surface 6 maintained in continuous contact with a cam face 7 of a cam arm 8, and its outwardly projecting flanges 9, 9 seating upon and carried by the upper surface of the plate or block 4.

The cam end 10 of the cam arm 8 is pivotally mounted at 11 between the spaced, upstanding arms A projecting upwardly from and preferably formed integral with the housing 1. A bracket 12 is secured to the housing 1 by spaced projections 13 projecting rearwardly from the housing and adapted to project through spaced openings in the web 14 of the bracket and thereafter bent over to lock the parts together. The outwardly projecting legs 15 and 16 of the bracket are provided with spaced screw holes 17 for receiving attaching screws 18 and whereby the housing is securely anchored into a corner of the cabinet 19.

The upper end 20 of the cam arm 8 is provided with a fixed pin or rivet 21 slidably mounted in an elongated slot 22 of a Z bracket 23 secured by screws or the like 24 to a depending flange 25 on a top or lid 26 for the cabinet. This pivotal connection between the cam arm 8 and the bracket 23 permits movement of the lid or top from its closed position (Fig. 2) to its open position (Fig. 1). In this open position the top or lid is preferably disposed at an angle of approximately 65° to 75° with respect to the horizontal, although this angle may be increased or decreased, as desired.

The cam arm 8 may be flat as shown in Figs. 1 to 5 inclusive, or it may be bent at 27 as shown in Fig. 6. Also the Z bracket 23 may be attached directly to the lid as in Figs. 1, 2 and 6, or it may be mounted upon a block of wood 28 as shown in Fig. 3.

Where the lid or top 29 is made flat rather than with a depending flange, an L-shaped bracket 30 may be secured to the underside of the lid in the manner shown in Fig. 5. This bracket like the Z-shaped bracket shown in the other views, is provided with an elongated slot 22 for slidably receiving the pin or rivet on the end of the cam arm 8.

From the above description and the disclosure in the drawing, it will be readily apparent that the present invention provides a unique and simplified construction of cover lift hinge which may be readily applied to cabinets or the like having a hinged or pivoted lid for access to the interior, and which cover lift automatically locks the lid in open or closed position. The cam face 7 is so contoured that when the lid is closed, the rise 31 engages the saddle 5 *and the compression in the spring 2 retains* [sufficiently to compress the spring 2 and retain] the lid in closed position, while when the lid is raised to its open position, the rise 32 engages and depresses the saddle 5 and spring whereby the lid is retained in open position until it is intended to be and is manually lowered by the operator.

Having thus disclosed by invention, I claim:

1. A cover lift hinge for retaining the lid of a cabinet in open or closed position, comprising a housing adapted to be mounted within the cabinet and in a corner thereof below the lid, a vertically disposd coil spring in said housing having its lower end seating on the base of the housing and its upper end free to move vertically, a saddle member seating upon the free end of the spring and movable longitudinally in the housing, a cam arm pivotally mounted adjacent one end in the upper end of the housing and thereat having a cam face seating upon and having rotative contact with said member, said cam face having spaced rises one of which compresses the coil spring and retains the lid in open position and the other compresses the coil spring and retains the lid in closed position, a bracket mounted on the interior of the lid at one end thereof and provided with an elongated slot, and a pin on the other end of the cam arm loosely carried in the slot and connecting the cover lift hinge to the lid.

2. A cover lift hinge for tensionally retaining the lid of a cabinet in open or closed position, comprising a housing adapted to be mounted wholly within the cabinet, tension means in said housing, an inverted, substantially U-shaped saddle movable in the housing and bearing against said tension means, a cam arm carried by and pivotally mounted in the upper end of the housing and having a cam face at one end projecting into the housing and maintained in rotative contact with the saddle, a bracket secured to the underside of the lid and provided with an elongated slot, and a projection on the other end of the cam arm and received in said slot, said cam face being so contoured as to tensionally retain the lid in either open or closed position.

[3. A cover lift hinge for retaining the hinged lid of a cabinet in either open or closed position, comprising a cam arm pivotally connected at one end to the lid, a housing mounted within the cabinet with the other end of the cam arm pivotally mounted in the housing, the last mentioned end of the cam arm provided with a cam face depending into the housing and having spaced rises, a member freely slidable in the housing, and a coil spring carried in the housing with one end free and in engagement with said member for forcing said member into continuous contact with the cam face, whereby when the lid is raised to open position, one of the rises on the cam face is rotated to a position where it engages said member and compresses the coil spring to retain the lid in raised position, and when the lid is lowered to closed position, the other rise is rotated to a position where it engages said member and thereby compresses the spring to retain the lid in closed position.]

[4. A cover lift hinge for retaining the lid of a cabinet in open or closed position, comprising a housing adapted to be mounted in a corner of the cabinet below the lid and thereat reinforcing the cabinet, a coil spring in said housing having its lower end seating on the base of the housing and its upper end free to move vertically, a saddle member carried by the free end of the spring and movable longitudinaly in the housing, a cam arm pivotally mounted in the upper end of the housing adjacent the saddle member and having a cam face projecting into the housing and thereat engaging said member, said cam face having spaced rises one of which compresses the coil spring and retains the lid in open position and the other compresses the coil spring and retains the lid in closed position, a bracket mounted on the interior of the lid and provided with an elongated slot, and a pin on the other end of the cam arm loosely carried in the slot and connecting the lift hinge to the lid.]

*5. A cover lift hinge for retaining the hinged lid of a cabinet in either open or closed position, comprising a cam arm pivotally connected at one end to the lid, a housing mounted within the cabinet with the other end of the cam arm pivotally mounted in the housing, the last mentioned end of the cam arm provided with a cam face depending into the housing and having spaced rises, a member freely slidable in the housing, and a coil spring carried in the housing with one end free and in engagement with said member for forcing said member into continuous contact with the cam face, whereby when the lid is raised to open position, one of the rises on the cam face is rotated to a position where it engages said member and compresses the coil spring to retain the lid in raised position, and when the lid is lowered to closed position, the other rise is rotated to a position where it engages said member, to have the force of the compressed spring act thereon to retain the lid in closed position.*

*6. A cover lift hinge for retaining the lid of a cabinet in open or closed position, comprising a housing adapted to be mounted in a corner of the cabinet below the lid and thereat reinforcing the cabinet, a coil spring in said housing having its lower end seating on the base of the housing and and its upper end free to move vertically, a saddle member carried by the free end of the spring and movable longitudinally in the housing, a cam arm piv-*

*otally mounted in the upper end of the housing adjacent the saddle member and having a cam face projecting into the housing and thereat engaging said member, said cam face having spaced rises one of which compresses the coil spring and retains the lid in open position and the other acted upon by the force of the compressed coil spring retains the lid in closed position, a bracket mounted on the interior of the lid and provided with an elongated slot, and a pin on the other end of the cam arm loosely carried in the slot and connecting the lift hinge to the lid.*

ALONZO ROBERT TURNER.

References Cited in the file of this patent or the original patent

UNITED STATES PATENTS

| Number | Name | Date |
|---|---|---|
| 399,714 | Wesselmann | Mar. 19, 1889 |
| 933,070 | Gleason | Sept. 7, 1909 |
| 1,549,705 | Antonio | Aug. 11, 1925 |
| 2,056,799 | McCorkell | Oct. 6, 1936 |
| 2,124,193 | Kriegbaum el al. | July 19, 1938 |
| 2,175,534 | Loftin et al. | Oct. 10, 1939 |
| 2,188,393 | Mueller | Jan. 30, 1940 |